US011003709B2

(12) United States Patent
Sporer et al.

(10) Patent No.: US 11,003,709 B2
(45) Date of Patent: May 11, 2021

(54) METHOD AND DEVICE FOR ASSOCIATING NOISES AND FOR ANALYZING

(71) Applicant: Fraunhofer-Gesellschaft zur Foerderung der angewandten Forschung e.V., Munich (DE)

(72) Inventors: Thomas Sporer, Fuerth (DE); Tobias Clauss, Hennef (DE); Judith Liebetrau, Leimbach (DE); Sara Kepplinger, Ilmenau (DE); Hanna Lukashevich, Ilmenau (DE); Dietmar Kepplinger, Eugendorf (AT)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/856,846

(22) Filed: Dec. 28, 2017

(65) Prior Publication Data

US 2018/0122398 A1 May 3, 2018

Related U.S. Application Data

(63) Continuation of application No. PCT/EP2016/065397, filed on Jun. 30, 2016.

(30) Foreign Application Priority Data

Jun. 30, 2015 (EP) ..................................... 15174634

(51) Int. Cl.
G10L 21/0208 (2013.01)
G10L 21/0232 (2013.01)
(Continued)

(52) U.S. Cl.
CPC .............. *G06F 16/61* (2019.01); *G06F 16/40* (2019.01); *G06F 16/60* (2019.01); *G06F 16/634* (2019.01);
(Continued)

(58) Field of Classification Search
CPC ......... G10L 21/02; G10L 25/60; G10L 25/72; G10L 25/78
See application file for complete search history.

(56) References Cited

U.S. PATENT DOCUMENTS

| 5,918,223 A | 6/1999 | Blum et al. |
| 6,556,682 B1 | 4/2003 | Gilloire et al. |
| (Continued) | | |

FOREIGN PATENT DOCUMENTS

| DE | 10109648 C2 | 1/2003 |
| DE | 10134471 A1 | 2/2003 |
| (Continued) | | |

OTHER PUBLICATIONS

Barchiesi, Daniele, et al. "Acoustic scene classification: Classifying environments from the sounds they produce." IEEE Signal Processing Magazine 32.3 (2015): 16-34. (Year: 2015).*

(Continued)

*Primary Examiner* — Brian L Albertalli
(74) *Attorney, Agent, or Firm* — Perkins Coie LLP; Michael A. Glenn

(57) ABSTRACT

What is described is a method for associating noises of at least one signal class (like disturbing noise) of a plurality of signal classes (like disturbing noise and non-disturbing noise). The method has the steps of "receiving environmental noises" and "establishing whether the environmental noises or a set of parameters derived from the environmental noises fulfill/s a predefined rule which describes the signal class of the plurality of signal classes". Starting from this, the steps of "logging that the predefined rule has been fulfilled", "recording the environmental noises received for a migrating time window", "deriving a set of parameters from the environmental noises for the migrating time window and storing the set of parameters" or "emitting an (Continued)

activation signal for another device for associating a noise" are performed.

23 Claims, 9 Drawing Sheets

(51) Int. Cl.
  *G06F 16/61*  (2019.01)
  *G06F 16/40*  (2019.01)
  *G06F 16/632*  (2019.01)
  *G06F 16/683*  (2019.01)
  *G06F 16/60*  (2019.01)
  *G06K 9/00*  (2006.01)

(52) U.S. Cl.
  CPC ....... *G06F 16/683* (2019.01); *G06K 9/00523* (2013.01); *G06K 9/00536* (2013.01); *G10L 21/0208* (2013.01); *G10L 21/0232* (2013.01)

(56) References Cited

U.S. PATENT DOCUMENTS

| | | | |
|---|---|---|---|
| 6,683,938 B1 | 1/2004 | Henderson | |
| 6,959,276 B2* | 10/2005 | Droppo | G10L 15/20 379/406.01 |
| 8,972,255 B2* | 3/2015 | Leman | G10L 15/20 379/406.03 |
| 9,847,096 B2* | 12/2017 | Konjeti | H04M 1/6058 |
| 10,134,423 B2* | 11/2018 | Vempada | G10L 25/51 |
| 2002/0083060 A1 | 6/2002 | Wang et al. | |
| 2003/0144838 A1* | 7/2003 | Allegro | G10L 21/0208 704/233 |
| 2004/0074378 A1 | 4/2004 | Allamanche et al. | |
| 2004/0138882 A1* | 7/2004 | Miyazawa | G10L 21/0208 704/233 |
| 2004/0267522 A1 | 12/2004 | Allamanche et al. | |
| 2005/0228649 A1 | 10/2005 | Harb et al. | |
| 2007/0183604 A1* | 8/2007 | Araki | G10L 17/26 381/58 |
| 2008/0300871 A1* | 12/2008 | Gilbert | G10L 15/20 704/233 |
| 2009/0115635 A1 | 5/2009 | Berger et al. | |
| 2011/0075855 A1 | 3/2011 | Oh et al. | |
| 2011/0208518 A1 | 8/2011 | Holtel et al. | |
| 2013/0040694 A1 | 2/2013 | Forutanpour et al. | |
| 2013/0231761 A1* | 9/2013 | Eronen | G10L 25/54 700/94 |
| 2014/0046878 A1* | 2/2014 | Lecomte | G10L 25/51 706/12 |
| 2014/0254816 A1 | 9/2014 | Kim et al. | |
| 2014/0270194 A1 | 9/2014 | Des Jardins | |
| 2015/0179181 A1* | 6/2015 | Morris | G10L 19/012 704/226 |
| 2015/0194151 A1* | 7/2015 | Jeyachandran | G10L 15/20 704/233 |
| 2016/0005422 A1* | 1/2016 | Zad Issa | G10L 25/84 704/226 |
| 2016/0372136 A1* | 12/2016 | Song | G06K 9/00718 |

FOREIGN PATENT DOCUMENTS

| | | |
|---|---|---|
| JP | H10170332 A | 6/1998 |
| JP | H10282985 A | 10/1998 |
| JP | 2000512832 A | 9/2000 |
| JP | 2001165763 A | 6/2001 |
| JP | 2003315143 A | 11/2003 |
| JP | 2005234074 A | 9/2005 |
| JP | 2005532582 A | 10/2005 |
| JP | 2006189367 A | 7/2006 |
| JP | 2008225056 A | 9/2008 |
| JP | 2011196991 A | 10/2011 |
| JP | 2012047483 A | 3/2012 |
| JP | 2014197898 A | 10/2014 |
| KR | 20010040669 A | 5/2001 |
| WO | 02065782 A1 | 8/2002 |

OTHER PUBLICATIONS

Hermansky, Hynek. "Perceptual linear predictive (PLP) analysis of speech." the Journal of the Acoustical Society of America 87.4 (1990): 1738-1752. (Year: 1990).*

Burkhard, Mahlon, and Klaus Genuit. "Merging Subjective and Objective Acoustical Measurements." Audio Engineering Society Conference: 11th International Conference: Test & Measurement. Audio Engineering Society, 1992. (Year: 1992).*

Nilsson, M., Dick Botteldooren, and Bert De Coensel. "Acoustic indicators of soundscape quality and noise annoyance in outdoor urban areas." Proceedings of the 19th International Congress on Acoustics. 2007. (Year: 2007).*

Giannoulis, Dimitrios, et al. "A database and challenge for acoustic scene classification and event detection." 21st European Signal Processing Conference (EUSPICO 2013). IEEE, 2013. (Year: 2013).*

Mydlarz, Charlie, Ian Drumm, and Trevor J. Cox. "Classification of soundscapes using a novel mobile and internet methodology." Inter-Noise and Noise-Con Congress and Conference Proceedings. vol. 2009. No. 3. Institute of Noise Control Engineering, 2009. (Year: 2009).*

Boris, Defreville et al., "Unpleasantness of urban sound environment based on and an acoustic approach", Forum Acusticum 2005 Budapest, Jan. 1, 2005, Seiten 1847-1851, XP0552297386, Jan. 1, 2005.

Judith, Liebetrau et al., "Quantifying Auditory Perception: Dimensions of Pleasantness and Unpleasantness", AES Convention 138; May 2015, AES, 60 East 10165-2520, USA, May 6, 2015, XP055297473, May 7, 2015.

Wang, Yao et al., "Multimedia Content Analysis Using Both Audio and Visual Clues", Wang, Yao, et al.: "Multimedia Content Analysis Using Both Audio and Visual Clues", IEEE Signal Processing Magazine, Nov. 2000, pp. 12-36, Nov. 2000, 12-36.

Xavier, Valero et al., "Hierarchical Classification of Environmental Noise of Vehicle Pass-Bys", Archives of Acoustics, Bd. 37, Nr. 4, Jan. 1, 2012, XP055297364, 2012, pp. 423-434.

Kibayashi, Shota et al., "Subjective Evaluation Estimation Method for Subjective Map of Noise", Multimedia, Distributed, Cooperative, and Mobile (DICOMO2016) Symposium, Information Processing Society of Japan, Jul. 2016, vol. 2016, No. 1, p. 141-148, Jul. 2016, 141-148.

Defreville, Boris et al., "Unpleasantness of urban sound environment based on and an acoustic approach", Forum Acusticum 2005 Budapest, Jan. 1, 2005, Seiten 1847-1851, XP0552297386, Jan. 1, 2005.

Liebetrau, Judith et al., "Quantifying Auditory Perception: Dimensions of Pleasantness and Unpleasantness", AES Convention 138; May 2015, AES, 60 East 10165-2520, USA, May 6, 2015, XP055297473, May 7, 2015.

Valero, Xavier et al., "Hierarchical Classification of Environmental Noise of Vehicle Pass-Bys", Archives of Acoustics, Bd. 37, Nr. 4, Jan. 1, 2012, XP055297364, 2012, pp. 423-434.

* cited by examiner

METHOD AND DEVICE FOR ASSOCIATING NOISES AND FOR ANALYZING

CROSS-REFERENCE TO RELATED APPLICATIONS

This application is a continuation of copending International Application No. PCT/EP2016/065397, filed on Jun. 30, 2016, which is incorporated herein by reference in its entirety, and additionally claims priority from European Application No. 15174634.4, filed on Jun. 30, 2015, which is also incorporated herein by reference in its entirety.

BACKGROUND OF THE INVENTION

Embodiments of the present invention relate to a method and to a device for associating noises of/to at least one signal class of a plurality of signal classes, and to a method and a device for analyzing noises of at least one signal class of a plurality of signal classes.

Noises may, for example, be subdivided into signal classes, like disturbing noises and non-disturbing noises. A subdivision into more disturbing noises and less disturbing noises, for example, would also be conceivable.

Disturbing noises are not always easy to classify. It is important to know that there are different factors which influence whether a noise is perceived as a disturbing noise. A bird, even when its chirping is loud (objective measurable parameter: sound pressure level) and is clearly distinctive from the other environmental noises (objective measurable parameter: dynamics factor), would subjectively not be perceived as a disturbing noise. A considerably quieter plane passing, however, would be perceived as a disturbing noise by many more test persons than the bird just mentioned.

The consequence here is that, when examining an environment, like a hotel, wellness area of a hotel or a workplace, relative to disturbing noises in order to allow a prediction of noise evaluation, for example, using current approaches, one has to leave evaluation to the test persons.

A purely automatized evaluation relative to the absolute loudness or volume or relative to level increases, for example, serves as a first hint, but is not sufficient for a final evaluation. Thus, there is need for an improved approach.

SUMMARY

According to an embodiment, a method for associating noises of at least one signal class of a plurality of signal classes may have the steps of: receiving environmental noises; establishing whether the environmental noises or a set of parameters derived from the environmental noises fulfill/s a predefined rule which describes the signal class of the plurality of signal classes; logging that the predefined rule has been fulfilled, or recording the environmental noises received for a migrating time window, or deriving a set of parameters from the environmental noises for the migrating time window and storing the set of parameters for the migrating time window, or emitting an activation signal for another device for recognizing a noise.

Another embodiment may have a non-transitory digital storage medium having stored thereon a computer program for performing a method for associating noises of at least one signal class of a plurality of signal classes, having the steps of: receiving environmental noises; establishing whether the environmental noises or a set of parameters derived from the environmental noises fulfill/s a predefined rule which describes the signal class of the plurality of signal classes; logging that the predefined rule has been fulfilled, or recording the environmental noises received for a migrating time window, or deriving a set of parameters from the environmental noises for the migrating time window and storing the set of parameters for the migrating time window, or emitting an activation signal for another device for recognizing a noise, when said computer program is run by a computer.

According to another embodiment, a device for associating noises of at least one signal class of a plurality of signal classes may have: a microphone for receiving environmental noises; a processor for establishing whether the environmental noises or a set of parameters derived from the environmental noises fulfill/s a predefined rule which describes the signal class of the plurality of signal classes; an interface for logging that the predefined rule has been fulfilled, or recording the environmental noises received for a migrating time window, or deriving a set of parameters from the environmental noises for the migrating time window and storing the set of parameters for the migrating time window, or emitting an activation signal for another device for recognizing a noise.

According to another embodiment, a method for analyzing noises of at least one signal class of a plurality of signal classes may have the steps of: receiving environmental noises at a first position; establishing whether the environmental noises of the first position or a set of parameters derived from the environmental noises of the first position fulfill/s a predefined rule which describes the signal class of the plurality of signal classes; receiving environmental noises at a second position; establishing whether the environmental noises of the second position or a set of parameters derived from the environmental noises of the second position fulfill/s a predefined rule which describes the signal class of the plurality of signal classes; and determining a relation between the environmental noises of the first position and the environmental noises of the second position or between the set of parameters derived from the environmental noises of the first position and the set of parameters derived from the environmental noises of the second position.

Another embodiment may have a non-transitory digital storage medium having stored thereon a computer program for performing a method for analyzing noises of at least one signal class of a plurality of signal classes, having the steps of: receiving environmental noises at a first position; establishing whether the environmental noises of the first position or a set of parameters derived from the environmental noises of the first position fulfill/s a predefined rule which describes the signal class of the plurality of signal classes; receiving environmental noises at a second position; establishing whether the environmental noises of the second position or a set of parameters derived from the environmental noises of the second position fulfill/s a predefined rule which describes the signal class of the plurality of signal classes; and determining a relation between the environmental noises of the first position and the environmental noises of the second position or between the set of parameters derived from the environmental noises of the first position and the set of parameters derived from the environmental noises of the second position, when said computer program is run by a computer.

According to still another embodiment, a system for analyzing noises of at least one signal class of a plurality of signal classes may have: a first unit having a first microphone for receiving environmental noises at a first position; a second unit having a second microphone for receiving environmental noises at a second position; and a processor for establishing whether the environmental noises of the first position or a set of parameters derived from the environmental noises of the first position fulfill/s a predefined rule which describes the signal class of the plurality of signal classes, and for establishing whether the environmental noises of the second position or a set of parameters derived from the environmental noises of the second position fulfill/s a predefined rule which describes the signal class of the plurality of signal classes; wherein the processor is configured to determine a relation between the environmental noises of the first position and the environmental noises of the second position or between the set of parameters derived from the environmental noises of the first position and the set of parameters derived from the environmental noises of the second position.

According to another embodiment, a method for associating noises of at least one signal class of a plurality of signal classes may have the steps of: receiving environmental noises; establishing whether the environmental noises or a set of parameters derived from the environmental noises fulfill/s a predefined rule which describes the signal class of the plurality of signal classes; logging that the predefined rule has been fulfilled, or recording the environmental noises received for a migrating time window, or deriving a set of parameters from the environmental noises for the migrating time window and storing the set of parameters for the migrating time window, or emitting an activation signal for another device for recognizing a noise; wherein the steps of receiving, establishing are repeated for neighboring positions; wherein the method further has determining a relation between the environmental noises at a first position and environmental noises at a second position, or a relation between the set of parameters derived from the environmental noises at the first position and the set of parameters derived from the environmental noises at the second position.

Another embodiment may have a non-transitory digital storage medium having stored thereon a computer program for performing a method for associating noises of at least one signal class of a plurality of signal classes, having: receiving environmental noises; establishing whether the environmental noises or a set of parameters derived from the environmental noises fulfill/s a predefined rule which describes the signal class of the plurality of signal classes; logging that the predefined rule has been fulfilled, or recording the environmental noises received for a migrating time window, or deriving a set of parameters from the environmental noises for the migrating time window and storing the set of parameters for the migrating time window, or emitting an activation signal for another device for recognizing a noise; wherein the steps of receiving, establishing are repeated for neighboring positions; wherein the method further has determining a relation between the environmental noises at a first position and environmental noises at a second position, or a relation between the set of parameters derived from the environmental noises at the first position and the set of parameters derived from the environmental noises at the second position, when said computer program is run by a computer.

Embodiments of the present invention provide a method for associating noises of at least one signal class (like disturbing noise) of a plurality of signal classes (like disturbing noise and non-disturbing noise). The method includes the steps of "receiving environmental noises" and "establishing whether the environmental noises or a set of parameters derived from the environmental noises fulfill/s a predefined rule which describes the signal class of the plurality of signal classes". Starting here, the steps of "logging that the predefined rule has been fulfilled", "recording the environmental noises received for a migrating time window", "deriving a set of parameters from the environmental noises for the migrating time window and storing the set of parameters" or "emitting an activation signal for another device for associating noises of at least one signal class" are performed.

Embodiments of this aspect are based on the finding that, starting from a database as may be determined in correspondence with another aspect (see below), like by comparing the current noise environment to the noises from the database or parameters obtained from the database or stored in the database, like audio fingerprints, it is possible to recognize the presence of subjectively perceived disturbing noises or to associate the noise to a class. This method can be executed in an automated manner and allows a forecast of the evaluation of a noise situation (chirping of a bird vs. air condition) solely using a stored database, without having any subjective evaluation done by humans.

Recognizing a rule match may exemplarily be done by comparing the environmental noises to previously buffered environmental noises or by comparing currently derived parameter datasets (audio fingerprint) to previously determined parameter datasets or by deriving psychoacoustic parameters and comparing to predetermined threshold values for same.

Another embodiment relates to a device for associating noises of at least one signal class of a plurality of signal classes. The device comprises a microphone for continuously listening to current environmental noises, a processor for comparing the current environmental noises to data stored in a database (recording disturbing noises or parameters describing the disturbing noises), and an interface for outputting information as soon as a disturbing noise has been identified in the current environment. Here, the data, like the recordings determined before, and the audio fingerprints determined before or the threshold values established before for the psychoacoustic parameters can be stored either internally or, in accordance with further embodiments, be read externally using a database, as may, for example, have been determined in accordance with the further aspect.

Starting from these objective disturbing noises recognized or a signal class, the information may be processed further either alone or in combination with an indication of time, an indication of place or a classification of the disturbing noise into one of the classes (a corresponding disturbing group: slightly disturbing, disturbing, highly disturbing). In accordance with an embodiment, these information are output to an external database.

Since in this embodiment only the evaluation of a location or this one position is provided or, in accordance with further embodiments, it is also conceivable to extend this evaluation to several positions, like several positions in space or an outdoor environment, i.e. several neighboring positions (like distributed over a city). Thus, a further embodiment provides a method where the steps of "recording", "comparing" and "outputting" are received for two neighboring positions. When there are information for two neighboring positions, a relation between the recordings for the first and the second position can be determined in order to determine a movement, a spatial extension or a direction of the subjectively perceived disturbing noise, for example.

In accordance with a further embodiment, in analogy to recognizing disturbing noises, it is also conceivable to recognize a different sequence, like a control instruction, using which a corresponding control signal is output. Here, the recording associated to the control signal may either be a speech command or, as described before, an acoustic signal classified as a disturbing noise. The control signal, for example, is output by a device which itself executes the method so that recording is started, for example, or an external device, like another device arranged at a different position which is switched to the recording mode by the control signal.

In accordance with further embodiments, the device outlined above may also comprise a communication interface, for communicating with a database for reading the disturbing noises or parameters determined before, or for outputting the information on the disturbing noises. In accordance with still further embodiments, it is also possible for the device to communicate with another device using this communication interface so that the disturbing noises can be obtained and/or analyzed for two neighboring positions.

An embodiment of a sub-aspect provides a method for analyzing noises of a signal class. The method comprises the step of continuously recording current environmental noises at a first and a second position. Recording here in turn either means directly recording the environmental noises or deriving same from a set of parameters pertaining to the environmental noises, like an audio fingerprint or psychoacoustic parameters. In addition, for each recording, a comparison to a previously obtained recording of a subjectively perceived disturbing noise or to a parameter describing the disturbing noise is performed in order to identify the disturbing noise for each position (first and second position). A relation between the recordings can be determined from the two recordings (first and second recordings) which comprise the one disturbing noise at different positions, in order to be able to analyze the resulting disturbing noise more precisely, for example relative to its position, extension or movement.

Embodiments of this aspect are based on the finding that it is possible, using the relation of two recordings of one and the same disturbing noise at two different positions, to acquire extended information on the disturbing noise itself. Here, at first the disturbing noises in the respective environment (i.e. at a first position and at a second position) are identified and, when being identified, are related to each other. Advantageously, it is possible here to either obtain information on a movement of the disturbing noise or on an extension of the disturbing noise or on a direction of propagation of the disturbing noise. In addition, it is also possible to differentiate between a local disturbing noise, i.e. only at one position, and a global event, i.e. one occurring at several positions. Recognizing characteristic noise events and their propagation of movement is possible using this method.

In accordance with embodiments, the step of determining a relation between the first and a second recording is done by analyzing a level difference between the first and the second recording. Alternatively or additionally, it would also be possible for a time offset, i.e. a latency or run time offset between the event in two recordings established at the two different positions to be established in the step of determining the relation. Additionally, the two recordings may also be evaluated relative to differences in frequency and Hall effects. Using all these analysis parameters, it is possible to determine a distance between the noise source and the recording position since the sound usually is decreasing with an increasing distance and/or there are frequency shifts such that the upper frequencies are cancelled.

In accordance with further embodiments, the method comprises analyzing the audio events or respective sources relative to a distance between a first and a second position, analyzing relative to a movement of a source of the subjective disturbing noise and/or analyzing relative to a quantity of the source of a subjective disturbing noise. These three analyses are based on evaluating the relation between the first and the second recording, i.e. from comparing the factors mentioned above, for example.

It is to be mentioned in this aspect that continuously recording may be done using a migrating time window. Furthermore, like in the above aspect, it would also be conceivable to read in the noise to be compared externally.

It is to be pointed out here that the method may of course be extended to third positions.

In embodiments in accordance with this aspect, recording may be started at a second position when a disturbing signal has been determined at a first position in order to allow temporal analysis of the propagating disturbing signal.

A further embodiment relates to a system for analyzing signals of a signal class. This system comprises two units having one microphone each for continuously recording current environmental noises. The two units may be positioned at different positions, like neighboring positions. "Recording" here again means both directly recording the environmental noise and deriving same from parameters, like an audio fingerprint. In addition, the system comprises at least one processor which may be integrated either in a first or the second unit and be configured to identify the noise by comparing the first and the second recording of the first and second units to at least one recording obtained before/audio fingerprint of the signal of the signal class or parameters describing the signal of the signal class. In addition, the processor is configured to establish a relation between the first and the second recording.

In accordance with embodiments, the two units may be connected to each other via a communication interface, like a radio interface.

In accordance with further embodiments, a computer program for executing one of the methods described above is provided.

Further Aspect

Embodiments of the present invention provide a method for generating a database from buffered recordings. The method comprises the steps of "receiving environmental noises", which exemplarily comprise a disturbing noise, and "buffered environmental noises for a migrating time window", like 30 or 60 seconds, for example, or, advantageously, more than 5 seconds. Alternatively, it would also be conceivable for the method to comprise the step of "deriving a parameter set relative to the environmental noises" and "buffering the set of parameters for the migrating time window". The buffered environmental noises or the buffered set of parameters are/is generally referred to as recording. Additionally, the method comprises the step of "obtaining a signal" which identifies a signal class (like disturbing noise) of a plurality of signal classes (disturbing noise and non-disturbing noise) in the environmental noises. The third basic step is "storing, responsive to the signal, the buffered recordings" in a memory, like an internal or external memory. These steps of obtaining and storing are repeated in order to set up the database which comprises a plurality of buffered recordings for the same signal class.

Embodiments of the present invention are based on the finding that, using a device which records continually and stores relevant positions in the environment, it is possible to set up a database in which the recording or characteristics, like an audio fingerprint or psychoacoustic parameters, of the recording are stored so that recognizing such a sound sequence at a later point in time is possible. Here, the concept assumes that the step of "recognizing a subjective disturbing noise or a noise of a class" is performed by a human who identifies or marks the disturbing noise or signal class using a button or key or a another input interface, for example. This signal is used as an indicator of cutting the sequence from the current continuous recording or extracting the characteristics and storing same in a memory with the database to be formed. Thus, it is easily possible to set up a library of disturbing noises or classifiers for unambiguously associating sound-describing parameters, which later on allows predicting a subjective noise perception.

In accordance with embodiments, the subjective disturbing noise can be described by a parameter, like an audio fingerprint, comprising individual parameters, like volume, dynamics, extent, increase in dynamics, frequency spectrum, monotony or repetitive character, or by psychoacoustic parameters, like sharpness, impulse characteristic, roughness, tonality, variation intensity or volume. Thus, in accordance with further embodiments, the method comprises the step of determining an audio fingerprint for the buffered recording or determining psychoacoustic parameters. Usually, it is sufficient for the recording or the audio fingerprint to be stored in the database, whereas the psychoacoustic parameters represent additional information. It is of advantage with the audio fingerprint that storing the recording takes place in an anonymized manner.

In the single step of obtaining a signal from a user interface, like a key, another alternative or additional signal which evaluates the current identified control noise subjectively may also be obtained. This subjective evaluation deals with allocating the audio signals to signal classes (like less disturbing or more disturbing). Here, the subjective evaluation is stored in combination with the respective part or parameter.

In accordance with further embodiments, a time stamp may also be stored in combination with the part or parameter. In accordance with still further embodiments, it would also be conceivable for current position information to be also stored by a GPS receiver, for example. In order not to make the database too big, it would also be feasible to store the data to be buffered in a data-reduced manner.

It is to be pointed out here that, in accordance with an embodiment, the memory or database is contained directly in the respective device executing the method, or may be provided externally in accordance with another embodiment.

A further embodiment relates to a corresponding device. The device comprises a microphone for continuously recording, a buffer for buffering, an interface for receiving the signal, and another memory for storing the recording belonging to a signal class (audio file, audio fingerprint or psychoacoustic parameters) pertaining to the disturbing noise identified. In accordance with further embodiments, the device may comprise an input interface, like a key, using which the presence of a subjective disturbing noise may be confirmed or, generally, the noise be allocated to a signal class. The input means may, for example, be extended by a way of classifying one of several signal classes, i.e. by an evaluation. In accordance with still further embodiments, the device may also comprise a communication interface via which the external memory (external database) is connected.

In accordance with further embodiments, a computer program for performing one of the methods described is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
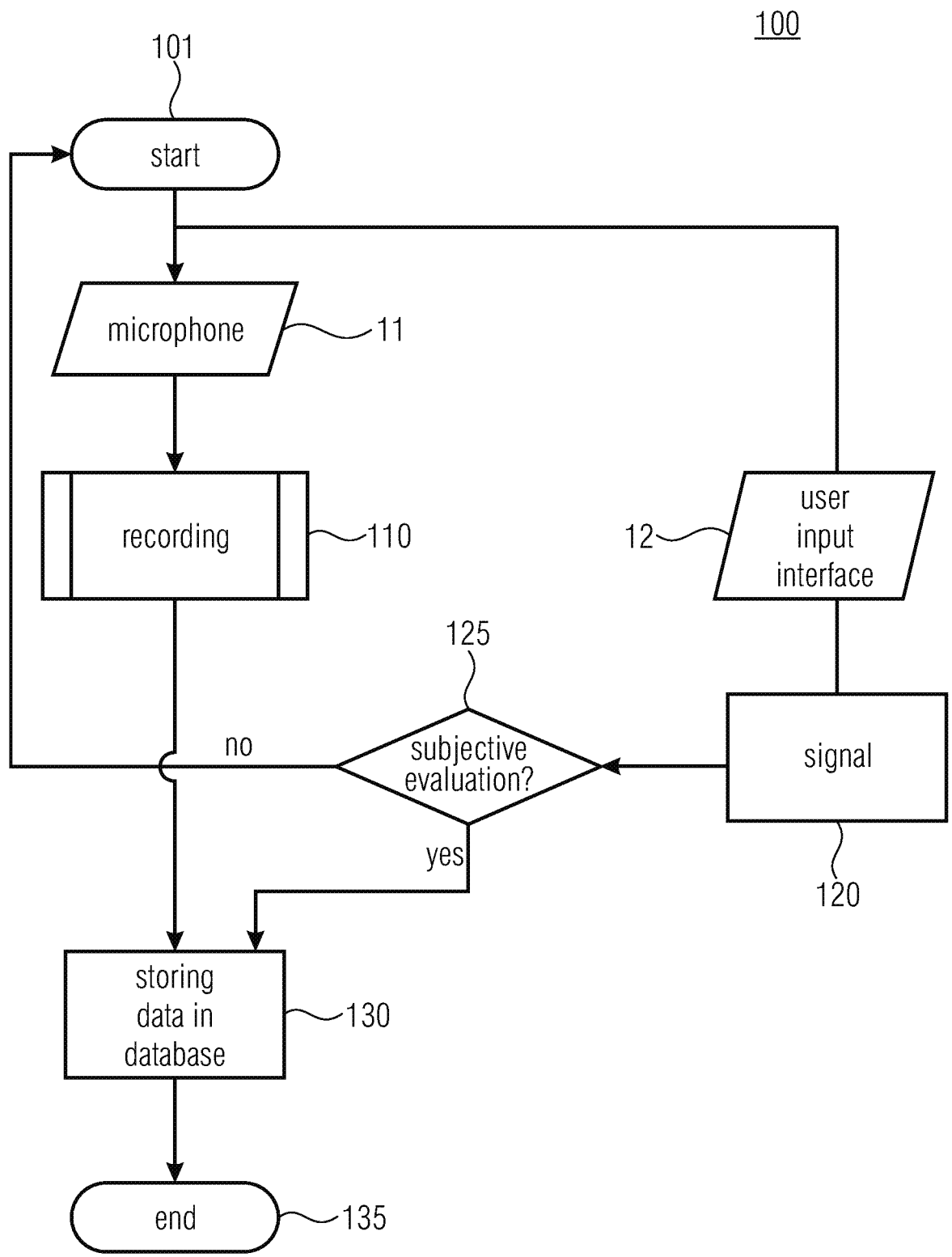
FIG. 1a is a flowchart for illustrating the method in accordance with aspect 1 "setting up a database" in a basic variation.

Before discussing embodiments of the present aspects below in greater detail, it is pointed out that elements and structures of equal effect are provided with equal reference numeral so that a description thereof is mutually applicable or interchangeable.

FIG. 1a shows a method 100 for setting up a database comprising the steps of "receiving and recording 110 using a microphone 11 and signal receiving" 120. When the signal 120 has been received (see place of decision 125), the recording of step 110 is stored in a database, which is illustrated using step 130. This step 130 basically represents the end of the basic method 100 (cf. end point 135).

It is to be pointed out as regards the step of "recording 110" that, when recording, usually there may be a sub-step of encoding. Encoding may also be implemented such that a so-called audio fingerprint, i.e. a derivation of characteristic parameters for the recording, is obtained. This audio fingerprint, when compared to a recording, is compressed strongly and thus anonymized, wherein the audio fingerprint still allows recognizing a comparable noise, i.e. a noise of the same class, using the audio fingerprint. Generally, an audio fingerprint may be described such that it is a representation of an audio signal representing all the essential features of the audio signal so that subsequent classification is possible. An audio fingerprint usually is not sufficient to allow decoding to form the real audio signals and thus protects the privacy. In analogy, or in parallel to encoding, there may be a sub-step of deriving parameters, like psychoacoustic parameters, which describe the recording.

The recording process 110 may also be described to be a ring buffer since the recording will usually be overwritten again and again and, thus, only a predetermined period, like, for example, 120, 60 or 30 seconds, or, generally, more than 5 seconds, is buffered. This ring buffer also offers the advantage that privacy requirements are met. This time window of the environmental noise for the last period is stored or finally stored in a further memory (like a database) when obtaining the signal 120, using step 130, so that it will be available at a later time. In order to set up the database effectively, performing the method 100 is repeated for several signals of one or of different signal classes.

This method 100 serves setting up a database where subjective disturbing noises received (i.e. recorded) by the microphone 11 are identified. Identifying is done using a step performed by the user which exemplarily executes the "signal 120 output" step using a key 12 (or generally a user input interface 12), when the user has recognized a disturbing noise in the environment. Since the microphone 110 listens to the environmental noises and these are buffered in step 110, these disturbing noises are also recorded so that the buffered recording or a part thereof may be stored in a permanent memory for setting up the database (cf. step 130). In case no disturbing noise has been recognized by the user, the method will be repeated, which is illustrated using the arrow from the subjective evaluation (decision element 125) to the starting point 101.

This method is of advantage in that in this way a sufficiently broad database, which comprises a plurality of recordings or parameters, like audio fingerprints, which are associated to subjective perceived disturbing noises can be set up.

It is to be pointed out here that the result of this is a dependence of the point in time of the signal on the time window. Exemplarily, the dependence results from the fact that the beginning of the time window at the time of the signal is at a fixed distance, like 30 or 60 seconds, before the time of the signal. In addition, the end of the time window may also be dependent on the time of the signal so that a time of the signal and an end of the time window coincidence, for example, or there is a temporal distance of 5 seconds (end before the time of the signal). Generally, the dependence is selected such that the recording time window will precede the time of the signal, wherein the signal may also be within the time window.

Figure 1B:
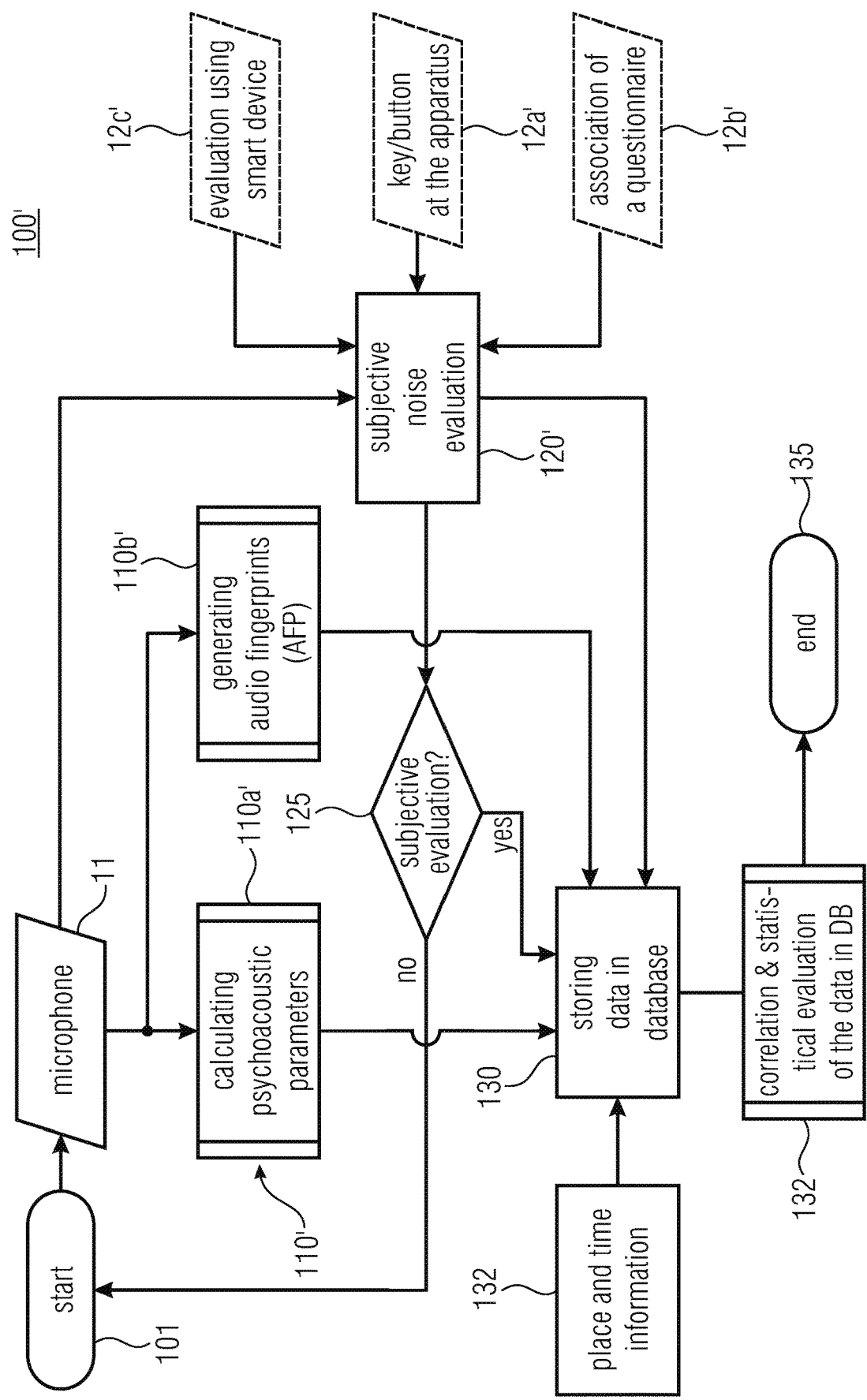
FIG. 1b is a flowchart for illustrating an extended method in accordance with aspect 1.

FIG. 1b shows an extended method 100' which also allows setting up a database, however, with extended information. The method 100' generally is based on the method 100 and is limited in its course by start 101 and end 135. Consequently, the method 100' also comprises the basic steps of recording 110', receiving 120' the signal relative to a subjective noise evaluation or, generally, relative to an allocation of the signal received into a signal class (like a disturbing noise) starting from a plurality of signal classes (like non-disturbing noise, slightly disturbing noise and highly disturbing noise), and storing the buffered recording 130, like using a database. In addition, steps 130 and 120' are connected via the point of decision 125.

In this embodiment, the step of recording 110' is subdivided into two sub-steps, i.e. 110a' and 110b'. Step 110a refers to calculating psychoacoustic parameters, like roughness, sharpness, volume, tonality and impulse characteristic and/or variation intensity, for example. Step 110b' is reduced to determining an audio fingerprint which describes the recording such that the characteristic features can be recognized again later on using the audio fingerprint.

There may be different input means for performing step 120' of subjective noise evaluation. These are "evaluation using a key or button on the apparatus which executes the method 100' (cf. reference numeral 12a'), associating a subjective noise evaluation using a questionnaire (cf. reference numeral 12b') or evaluation using a smart device (cf. reference numeral 12c'). These three evaluation variations 12a', 12b' and 12c' may be employed either alone or in combination in order to perform the step of subjective noise evaluation 120'. As soon as there is an evaluation (cf. point of decision 125), the psychoacoustic parameters (cf. reference numeral 110a') and/or the audio fingerprint (cf. reference numeral 110b') are stored in the memory, which is illustrated in step 130.

In accordance with further embodiments, time and/or location information may be added in addition to the pure parameters or the fingerprint or the part of the audio recording. These are also stored in step 130 and originate from another step 132 which correspondingly comprises determining the current location and/or determining the current time.

When the database has been set up and has a corresponding size (cf. step 130), it can be evaluated, like by correlation or statistical evaluation, as it illustrated in step 132.

A typical application case for the methods 100 and 100' described above is that an apparatus is, for example, located in a hotel room and monitors the current environmental noises. When the hotel guest wants to have his peace and quiet in his hotel room, but is prevented from doing so by disturbing noises, he or she can mark these disturbing noises. The result which may be achieved by this is that the room may not be too loud, but that there may be certain noises, like air conditioning, which prevent the guest from going to sleep. Using the apparatus, he or she can perform a subjective evaluation, i.e. classification into signal classes, like "disturbing", "very disturbing" or "highly disturbing". The evaluation characterizes the noise situation evaluated using different parameters. Finally, the audio fingerprints, psychoacoustic parameters or, generally, the recording, associated to one of the signal classes, are stored in the database.

Three variations of apparatuses will be discussed below referring to FIGS. 1c, 1d and 1e.

Figure 1C:
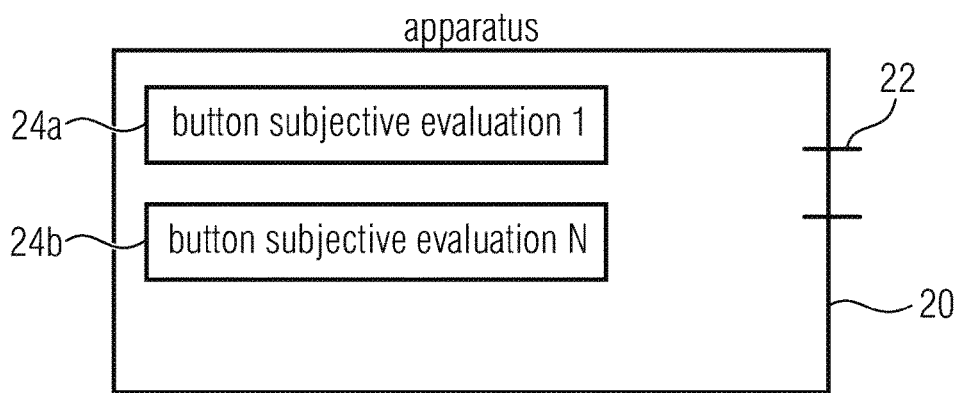
FIGS. 1c to 1f show variations of devices for aspect 1.

FIG. 1c shows a first apparatus variation, i.e. the device 20, which is connected to the actual signal processing unit (not illustrated) via an interface or radio interface and is basically configured to emit the signal for identifying a disturbing signal or a certain signal class. Here, the device 22 in this embodiment comprises two keys 24a and 24b for which a subjective evaluation may be performed. These keys 24a and 24b are associated to different signal classes.

The device 20 may exemplarily be a smart device, like a tablet computer, a smartwatch, a smartphone, which comprises the virtual keys 24a and 24b integrated in an app. This app may exemplarily also include a questionnaire by means of which further information of general quality may be collected from the user, like the hotel guest.

When operating the button 24a or 24b, the method of buffering environmental noises or deriving parameters and then actually storing is performed in the actual data collection device. This external device may, for example, be a server having a microphone at a respective place of monitoring.

Figure 1D:
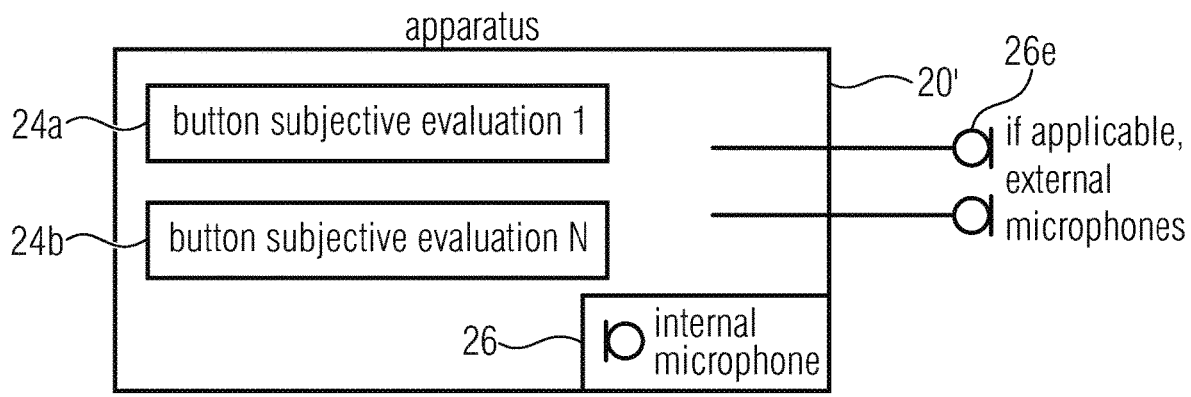

FIG. 1d shows another variation in which an internal microphone 26 for receiving the environmental noises is integrated in the device 20' which comprises the buttons 24a and 24b. Additionally or alternatively, an external microphone 26e may be connected to the device 20' via an interface.

Figure 1E:
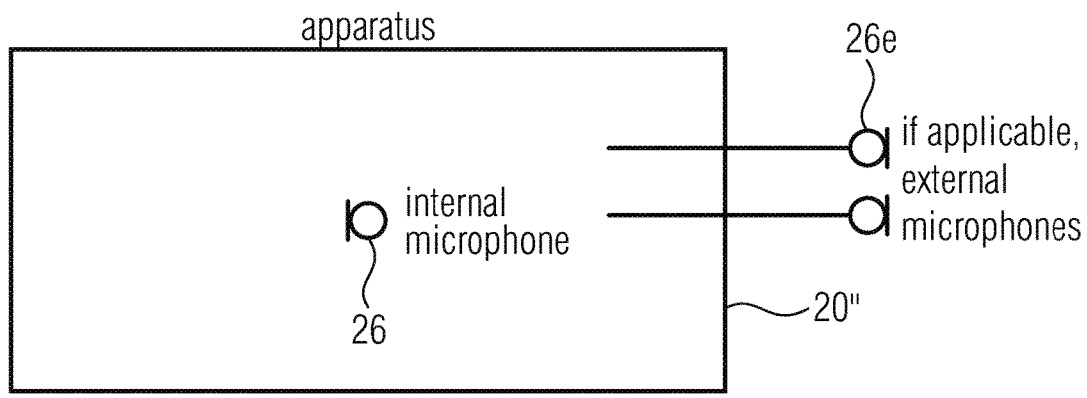

FIG. 1e shows another variation of the device 20'' which does no longer comprise a button as an input means, but only comprises the internal microphone 26 or the optional or alternative external microphone 26e, and can be controlled using this speech command which may be associated to an environmental noise of a signal class.

Making reference to the devices 20' and 20'', it is to be noted at this point that several external microphones could also be connected. It would also be conceivable here that, in addition to the normal air-borne sound, structure-borne sound is also recorded (meaning that the respective device comprises a structure-borne sound receiver).

Referring to the embodiment of FIGS. 1c and 1d, it is to be noted that the different buttons 24a and 24b may also be extended by further buttons. For differentiating the buttons, color coding may be provided: red=disturbing, yellow=indifferent, green=very pleasant environmental noise (the latter exemplarily applies when bird chirping is clearly audible but is perceived as a desirable noise).

Referring to FIGS. 1c to 1d, it is to be mentioned that the apparatuses 20, 20' and 20" may additionally be integrated as software applications and, additionally, in apparatuses, like smartphones, tablet computers or smartwatches. These software applications are able to allow the following functions:

- extending the detection of a noise quality as mentioned above by questionnaire techniques or different subjective acquisition techniques;
- using sensor systems (microphones, GPS, tilt sensors, bio feedback functions) present in the further apparatuses;
- wireless or, if applicable, mechanical connection to the apparatus developed here for data communication;
- full control of the apparatus developed here using software developed here.

Figure 1F:
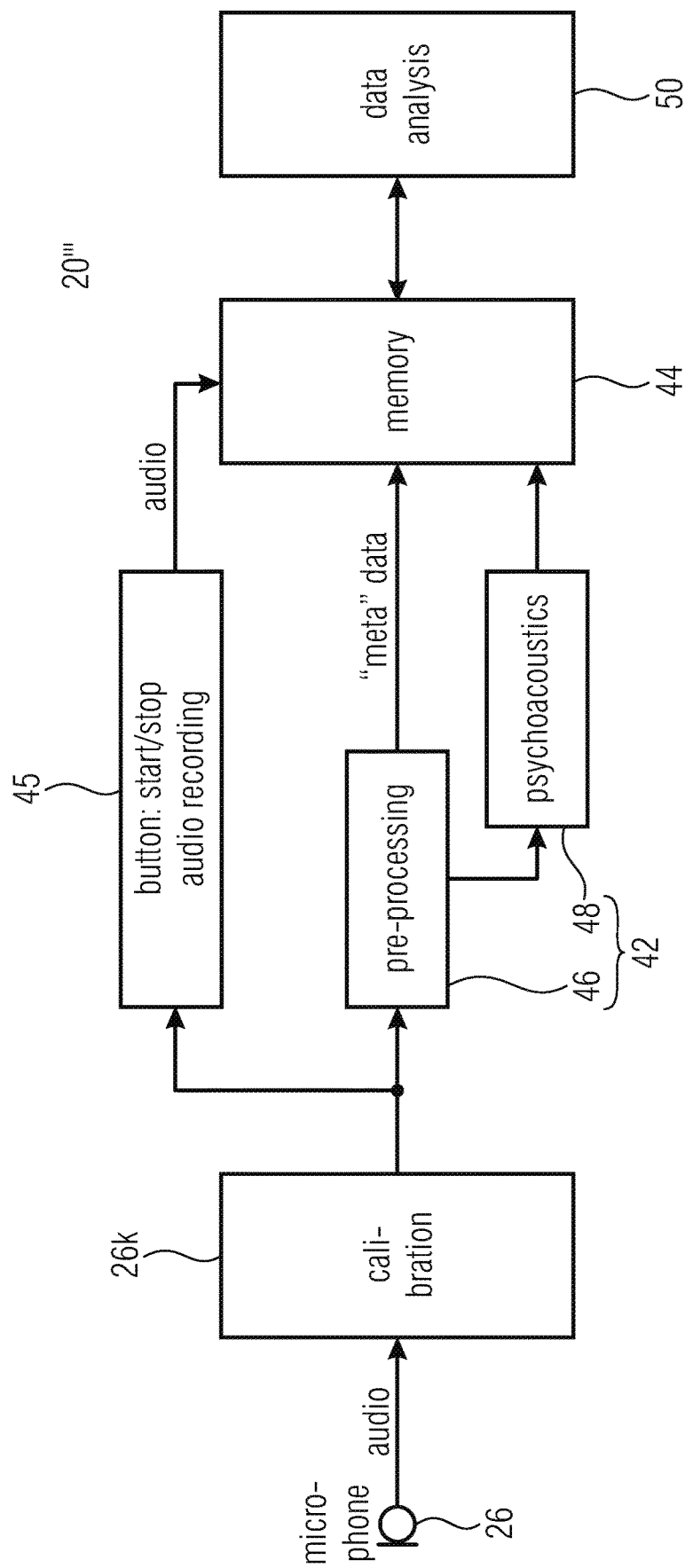

FIG. 1f shows the components of a device 20'''. The device 20''' comprises a microphone 26, optional calibrating means 26k for calibrating the microphone, and a processing unit 42 and a memory 44.

The processing means 42 comprises preprocessing 46 for coding the audio file or for deriving an audio fingerprint, and a unit for determining psychoacoustic parameters 48. Both the metadata of preprocessing 46 and the psychoacoustic parameters of the unit 48 are written to the memory 44. In addition, the audio signal may be stored or stored more exactly in the memory 44 by means of the unit 49, for example controlled by a button.

The calibrating means 26k serves for providing all the sensors with a defined value of sensitivity. Here, a measurement or recording, of the switch, the frequency response or compression, for example, is performed beforehand.

Starting from the audio sample stored, metadata (audio fingerprint of the psychoacoustic parameter), and the marking by means of one of the input means from FIGS. 1c to 1d, the actual data analysis by means of the data analyzer 50, and association to the individual signal classes may then be performed.

It is to be pointed out here that the device will typically be a mobile device so that it can typically be supplied with power using a battery or an accumulator. Alternatively, a conventional power supply would also be feasible. In order to store the recordings, the device may also comprise a memory medium, like a portable memory medium (like SD card), or the connection to a server. This connection to a server is done via a wire or glass fiber interface or even a radio interface. On the protocol level, there are different ways of doing this, which will not be discussed here in greater detail.

For an improved evaluability, the device may also comprise means for exact synchronization with other apparatuses, like a time code or a world clock, for example. In addition, it would also be conceivable for the device to be coupled to a position determining unit, like a GPS receiver, or have the same integrated in order to determine which disturbing noises have been determined at which position or been perceived as being disturbing.

It is to be pointed out here that, in correspondence with further embodiments, the method 100 or 100' may also comprise pre-calibration (cf. calibrating means 26k). This means that, in correspondence with embodiments, the method 100 or 100' discussed above comprises a step of calibrating.

Relating to aspect 1, it is to be pointed out that, in correspondence with embodiments, it would also be conceivable for all these devices to perform data-reduced recording of the measuring data in order to reduce data. The data reduction may also be of advantage with regard to long-term measurements. Depending on the degree of compression or erroneousness, it can be ensured that privacy can be preserved, since the data monitored can be compressed such that basically only parameters, like psychoacoustic parameters (roughness, sharpness, tonality etc.) or an audio fingerprint are/is recorded. It is to be pointed out again here that the precise decision of whether to use a recording or an audio fingerprint or only psychoacoustic parameters is influenced essentially by legal frame conditions for data and consumer protection.

As has been discussed above, so-called "audio fingerprints" are used, wherein there are different variations of this which will be discussed in greater detail below. A number of methods are known already, using which features or fingerprints can be extracted from an audio signal. U.S. Pat. No. 5,918,223 discloses a method for contents-based analysis, storage, recovery and segmentation of audio information. An analysis of audio data generates a set of numerical values, which is referred to as a feature vector, which can be used to classify and rank the similarity between individual audio pieces. The volume of a piece, the pitch, the brightness of tones, the bandwidth and the so-called Mel-Frequency Cepstral Coefficients (MFCCs) of an audio piece are used as features for characterizing or classifying audio pieces. The values per block or frame are stored and then subjected to a first derivation relative to time. Statistical quantities, like the mean value or the standard deviation, of each of these features, including the first derivations thereof are calculated from this in order to describe a variation over time. This set of statistical quantities forms the feature vector. The feature vector thus is a fingerprint of the audio piece and can be stored in a database.

The expert publication "Multimedia Content Analysis", Yao Wang et al., IEEE Signal Processing Magazine, November 2000, pages 12 to 36, discloses a similar concept for indexing and characterizing multimedia pieces. In order to ensure an efficient association of an audio signal to a certain class, a number of features and classifiers have been developed. Time-range features or frequency-range features are suggested as features for classifying the contents of a multimedia piece. These comprise the volume, the pitch as a basic frequency of an audio signal shape, spectral features, like the energy contents of a band relative to the total energy contents, cut-off frequencies in the spectral course and others. Apart from short-time features relating to the so-called sizes per block of samples of the audio signals, long-term quantities are suggested which relate to a longer period of the audio piece.

Further typical features are formed by forming the time difference of the respective features. The features acquired in blocks are rarely directly passed on as such for classification, since they exhibit too high a data rate. One conventional form of further processing is calculating short-term statistics. Among these are calculating a mean value, variance and temporal correlation coefficients, for example. This reduces the data rate and, on the other hand, results in improved recognizing of an audio signal.

WO 02/065782 describes a method for forming a fingerprint to form a multimedia signal. The method relates to extracting one or several features from an audio signal. The audio signal here is divided into segments and processing as to blocks and frequency bands takes place in each segment.

Band-wise calculation of energy, tonality and standard deviation of the power density spectrum are mentioned as examples.

A device and a method for classifying an audio signal are known from DE 101 34 471 and DE 101 09 648, wherein the fingerprint is acquired by a measure of the tonality of the audio signal. The fingerprint here allows a robust, contents-based classification of audio signals. The documents mentioned here reveal several possibilities of generating a measure of tonality over an audio signal. In this case, transferring a segment of the audio signal to the spectral range is the basis of calculating the tonality. The tonality can then be calculated in parallel for a frequency band or for all frequency bands. However, the disadvantage of such a system is that, with an increasing distortion of the audio signals, the fingerprint is no longer expressive enough and that recognizing the audio signal is no longer possible with satisfying reliability. However, distortions occur in very many cases, in particular when audio signals are transmitted using a system of low transmission quality. At present, this is the case in particular with mobile systems or in the case of strong data compression. Such systems, like mobile phones, are primarily implemented for a bidirectional transmission of voiced signals and frequently only transmit music signals at very low a quality. There are further factors which may have a negative influence on the quality of a signal transmitted, like microphones of low quality, channel disturbances and transcoding effects. For a device for identifying and classifying a signal, the consequence of a deterioration of the signal quality is a strongly deteriorated recognizing performance. Examinations have revealed that, in particular when using a device or method in accordance with DE 101 34 471 and DE 101 09 648, changes in the system while maintaining the recognizing criterion of tonality (Spectral Flatness Measure) do not result in further significant improvements in the recognizing performance.

When assuming that a sufficient database comprising noises, like disturbing noises of different signal classes, has been set up, starting from this, a certain disturbing noise can be searched for in any environment and it can then be logged whether such a disturbing noise has been recognized. This method is illustrated in FIG. 2a.

Figure 2A:
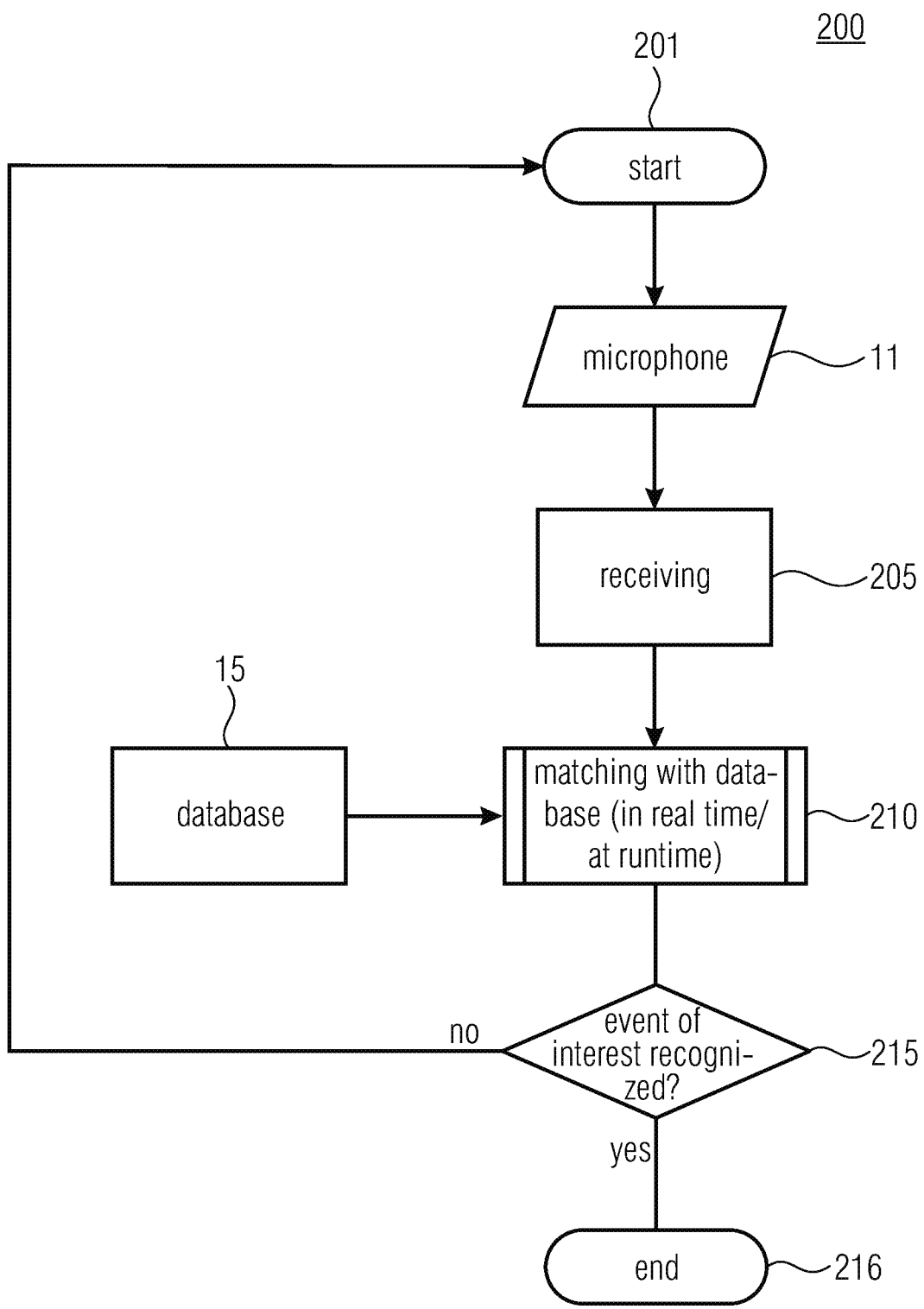
FIG. 2a is a flowchart for illustrating a method of corresponding basic variations of aspect 2; "recognizing noises of a signal class"

FIG. 2a shows the method 200 comprising step 210 of matching environmental noises received via the microphone 11 (cf. step of receiving 205), to recordings from the database 15. As soon as a match has been found, which is illustrated in the place of decision 215, a signal is output, like for logging or for excluding further action. As long as no match has been found, the method will be repeated, which is illustrated using the arrow to the start point 201.

In correspondence with embodiments, the respective audio fingerprints of the current environmental noises, instead of the recordings, may be compared to audio fingerprints stored before in the database 15. The method here comprises determining the audio fingerprint of the current environmental noise and comparing it to audio fingerprints stored in the database 15.

Even when it is assumed in the method 200 that matching environmental noises or audio fingerprints to environmental noises/audio fingerprints stored in the database 15 beforehand takes place for recognizing/associating, expressed generally, the environmental noise may be monitored relative to a rule. In the case of comparing environmental noises/audio fingerprint, the rule would mean a "partial match".

Another such rule may, for example, be volume value to simply be exceeded or threshold values relating to psychoacoustic parameters to be exceeded. In accordance with embodiments, deriving psychoacoustic parameters of the current environmental noises takes place, which are compared to predefined respective threshold values by the means of the predefined rule in order to recognize the occurrence of such an event.

In accordance with an extended embodiment, the method may not only purely recognize such disturbing noises, but associate, i.e. classify, the noises to voice, motor noise, music, church bells or shots, for example.

One potential scenario of application for such a method which exemplarily is executed on a smartphone or a device especially designed for this is for the device to be located in a hotel room and monitor the environmental noises. Here, the environmental noises are evaluated using the data from the database 15, and it is logged how many and which of the noise events probably perceived as being disturbing have taken place over time. This may, for example, be counting disturbing air condition noises in the course of the day. As an alternative to logging, audio recording of this noise or storing the environmental noises buffered beforehand (see above) may be performed. The underlying idea is that the hotel operator is able to forecast and evaluate the noise perception using this method.

Even when the above embodiments have assumed that noises of different signal classes are recognized and associated separate from one another, it is to be mentioned here that, in accordance with further embodiments, it would also be possible to recognize and associate several noises of different signal classes, which may be overlapping, for example.

Figure 2B:
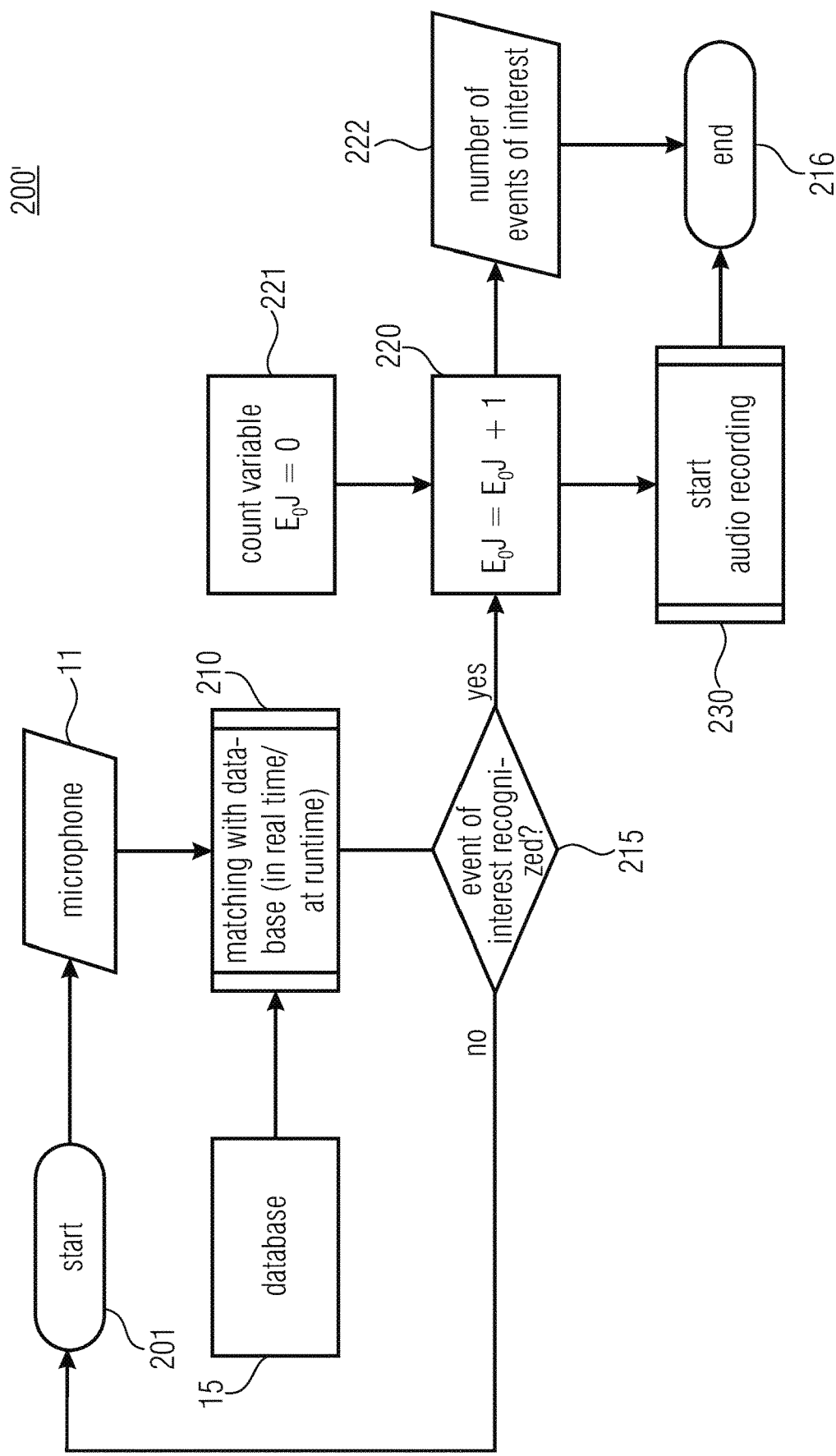
FIG. 2b is a flowchart of an extended embodiment of aspect 2.

FIG. 2b shows an extended method 200' which, between the step or point of decision 215 and the end 216, comprises further steps.

These are counting the events by means of step 220 or using a cell variable 221 so that the number of events 222 is obtained as a result. Optionally, audio recording can be started by the event having been recognized, as is illustrated using step 230.

Figure 2C:
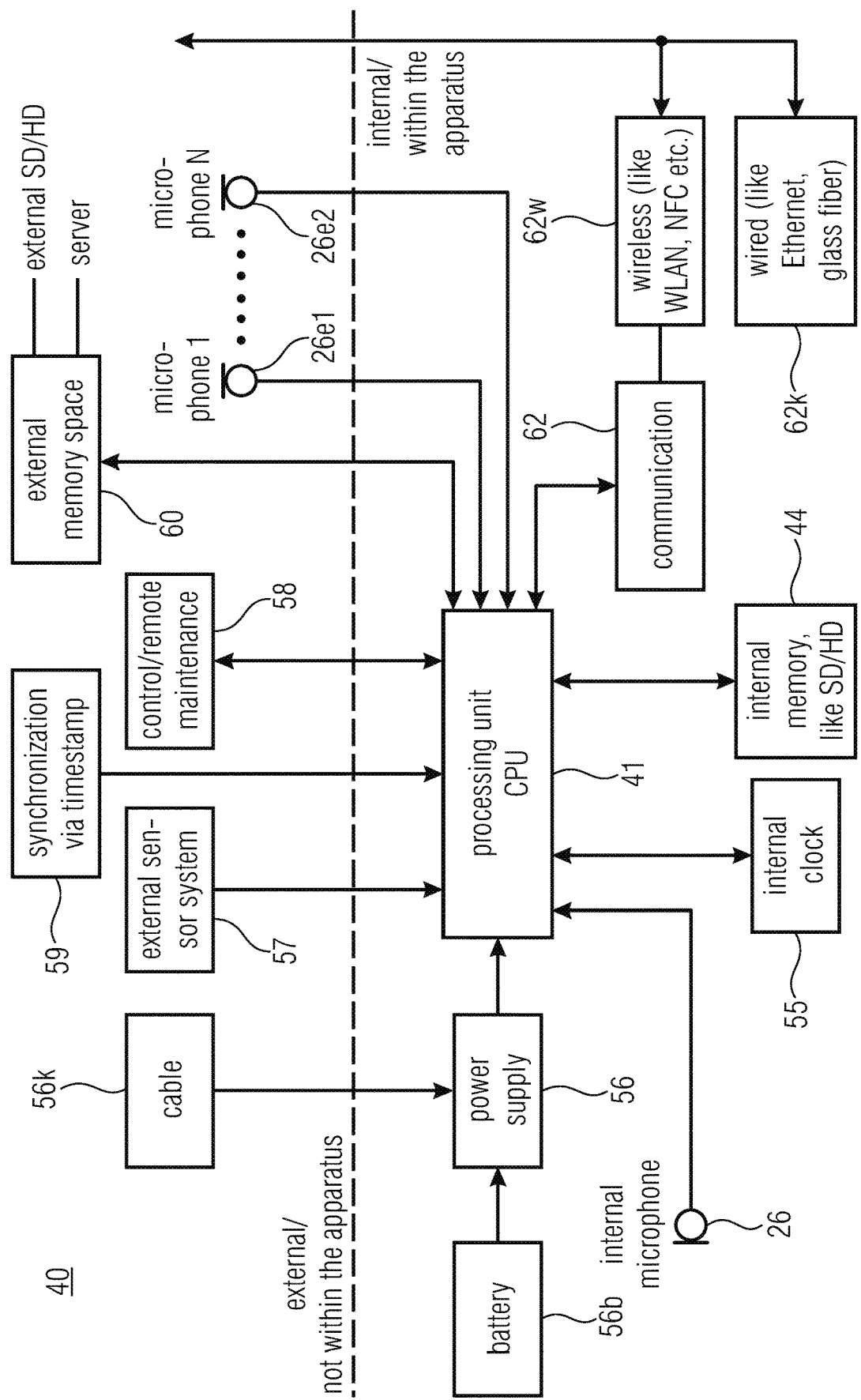
FIG. 2c is a schematic block diagram of a device of aspect 2.

FIG. 2c shows a further implementation of the device 40. It comprises, as a central unit, a processor 41 which performs the actual step of analyzing/matching. In the first place, it uses the internal microphone 26, wherein accessing external microphones 26e1 and 26e2 would also be conceivable. The data for matching are stored in the internal memory 44, for example.

Optionally, the processor is configured to determine and match audio fingerprints and/or psychoacoustic parameters so as to obtain a corresponding rule match.

In order to allow this functionality, optionally further peripheral units, like the internal clock 55, the battery 56b or, generally, a power supply 56, which may also be realized using that cable 56k, are provided. Optionally, the processor also accesses further sensor elements 57, control units 58, like the recording activation button, or a timer 59. Here, in accordance with further embodiments, the processor 41 may also be configured to perform an objective noise evaluation in order to establish a correlation in combination with the subjective evaluation (recognizing subjective tonal events).

In correspondence with embodiments, starting from the subjective evaluation of pleasantness obtained before, the CPU can classify/sort the individual recognized noises of the signal classes in different evaluation matrices, depending on the respective noise class.

In accordance with further embodiments, an external data storage 60, like an external hard disk or a server, may also be provided for storing or loading the database. This connection may be a wired connection or a wireless one. In wireless communication, in correspondence with further embodiments, a communication interface 62, like a wireless interface 62w or a wired interface 62k, which realizes external access, is to be provided.

In accordance with another aspect, a system is provided which basically consists of two of the devices 40 described before which are combined with each other such that they are mutually activating as soon as a corresponding noise, i.e. signal class, has been received in one of the devices. This system serves for analyzing or evaluating in greater detail noises of the respective noise classes. The method discussed below in FIG. 3 is performed here.

Figure 3A:
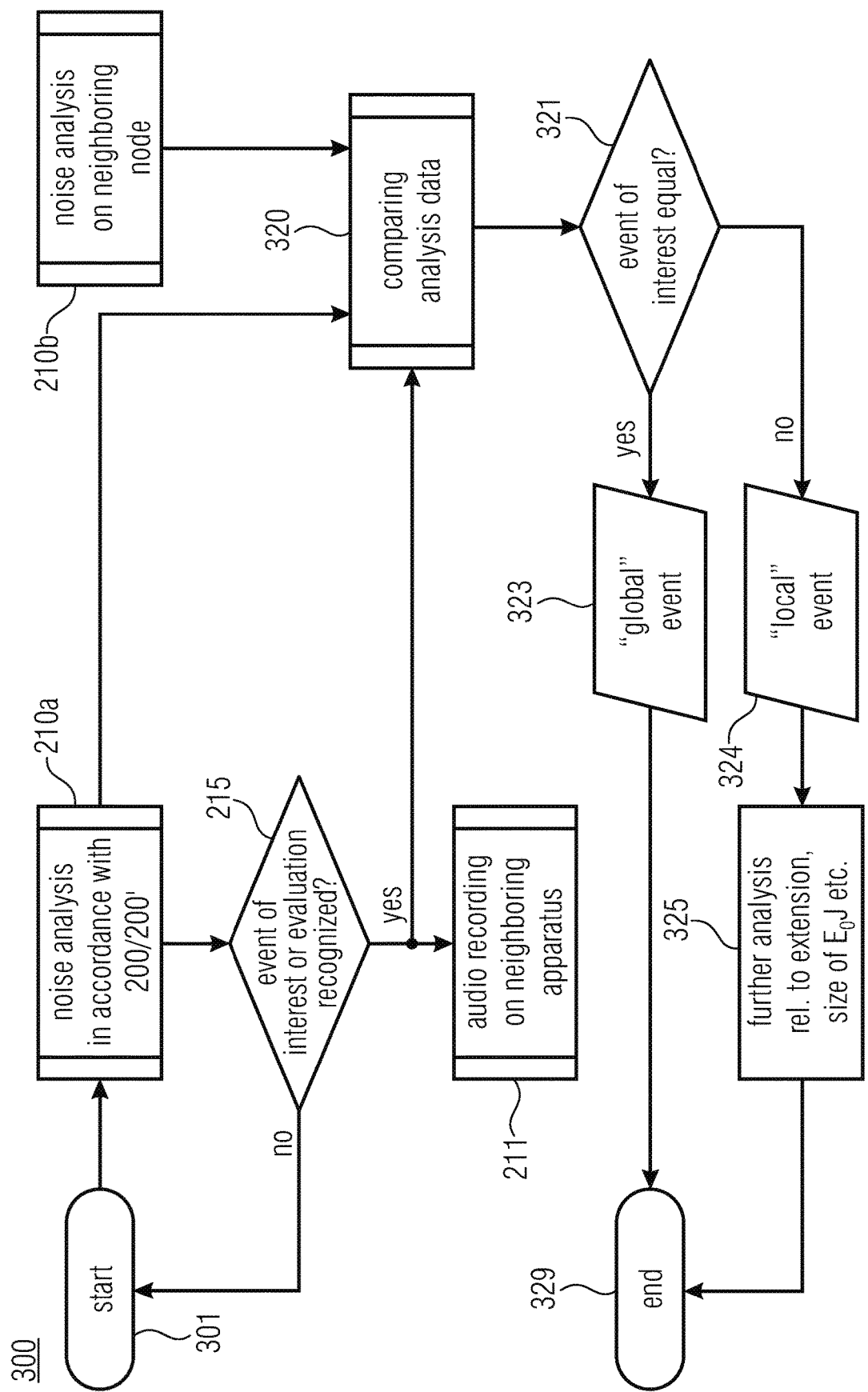
FIG. 3a is a flowchart for illustrating the method of a basic variation of aspect 3 "analyzing noises of individual signal classes"

FIG. 3a shows a method 300 comprising the step of noise analysis in correspondence with the method 200 or 200' which is performed at a first position and at a second position. This means that step 210 exists twice (cf. 210a and 210b).

The recording or the parameters determined, like the audio fingerprints at the two positions (resulting from steps 210a and 210b), are then compared in another step 220.

The two steps 210 at the two neighboring positions may, in accordance with embodiments, be mutually dependent, as is illustrated using the optional step "audio recording on neighboring apparatus 211". Alternatively, another action may be performed at the neighboring apparatus. The reason for this is that, when the first apparatus which executes the method 210a, for example, recognizes a noise and activates the second apparatus which executes the method 210b, the same noise can be recognized at a different position. It is finally to be mentioned here that, starting from the place of decision 215, there is another arrow to the starting point 301 which basically hints to the fact that the method of noise analysis 210a will be performed until a corresponding match has been found.

Since the positions are typically spatially neighboring, it is possible to estimate a propagation of the noise, a speed or a larger noise source in this way.

Exemplarily, when comparing its own analysis to an analysis on a different apparatus at the same time, it can, when one and the same event has been recognized at several apparatuses, be determined whether this is a global event (cf. reference numeral 232 after the field of decision 321), like thunder and lightning, or a local event (cf. reference numeral 324 after the field of decision 321). With a global event 323, usually the level difference between the "near" and the "remote" apparatus is negligibly small (level ~1/r, change of r small relative to r). With local events 324, the level difference is large (level ~1/r, change of r great relative to r). A local event may, for example, be a cry for help, an explosion, an open-air concert. With a local event, further analyses, i.e. the analysis 325 relating to further parameters, may follow. Starting from the temporal offset or frequency shifts, a quantity of the local event, propagation or timeline can be determined. Determining the global event 323 or local event 324, like the analysis 325 thereof, basically is the end 329 of the method.

One possible scenario of application is for several apparatuses to be distributed over a city center, for example. All the apparatuses are connected to one another via a data connection (like a wired, wireless, Ethernet or LAN connection). A connection using a server would also be possible. All the apparatuses analyze the noise situation (psychoacoustic parameters, audio fingerprint). One of these apparatus recognizes a characteristic event, like a signal class classified in the database beforehand. An audio recording is triggered on the spot. At the same time, the apparatus triggers a behavior, like an action on a neighboring node. By comparing the two nodes, a global and a local event may be differentiated between, as has been discussed above.

For the embodiment where there are two noises of different classes at the same time, in accordance with another embodiment, it would also be feasible for the noises to be traced even when the noises do not behave (move) equally or are associated to a local event on the one hand and a global event on the other hand. Exemplarily, the noise of a motor vehicle moving from a position A via B to C could be traced, whereas a siren (like police siren) sounds at the position B over the entire time. Another example would be birds chirping, as well as traffic noise and a fire engine—birds chirping may be loud, but pleasant, traffic noise is quiet enough in order not to be disturbing, but a fire engine is traced over several apparatuses and generates an increased "attentiveness" via the signal class.

The method 300 is basically performed by a system comprising two of the devices 40 (FIG. 2c).

Figure 3B:
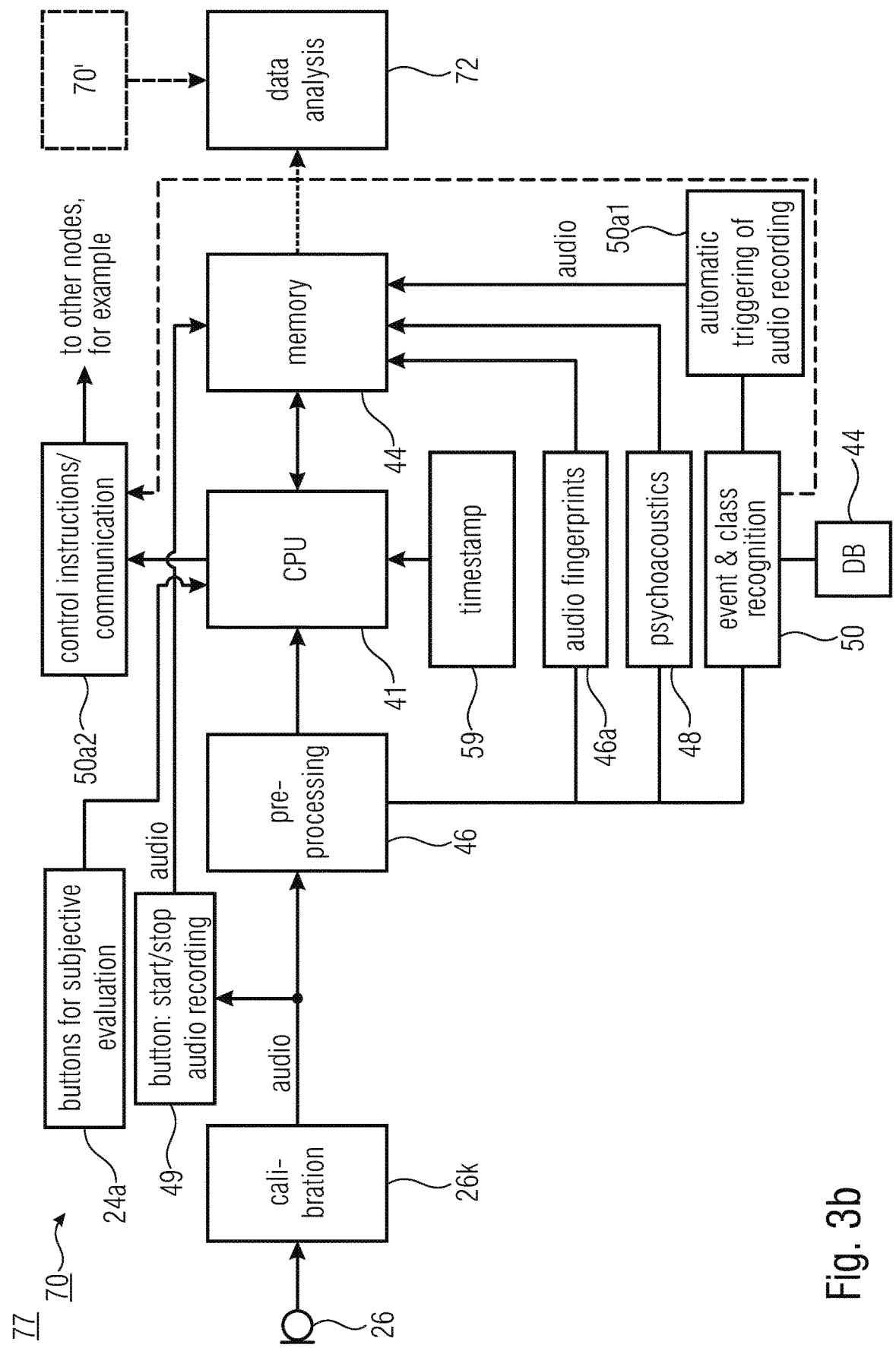
FIG. 3b is a schematic block diagram of a device of aspect 3.

Since, however, an extra interface is provided for connecting the two devices, little variations may also be possible, as is illustrated in FIG. 3b.

FIG. 3b shows a device 70 comprising, on the input side, a microphone 26 and an optional calibration unit 26k. The audio stream received by the microphone is preprocessed by means of preprocessing 46 in order to derive audio fingerprints (cf. reference numeral 46a) or psychoacoustic parameters (cf. reference numeral 48), for example. In parallel, events or classes may be recognized (cf. reference numeral 50). By means of recognizing events/classes, automatic audio recording can be triggered on the one hand (cf. reference numeral 50a1) or a control instruction, like for activating the further node (cf. reference numeral 50a2 or further device 70"), can be emitted. The means for outputting the control instruction 50a2 may exemplarily activate the memory which then receives and records the data from the means for generating the audio fingerprint 46a or the means for deriving the psychoacoustic parameters 48. The audio signal may also be stored in the memory 44, wherein here, too, recording may be allowed or prevented by a button 49a. In this embodiment, the CPU 41 may also be connected to a timer 59.

Apart from the device 70, a device 70', which basically fulfills the same functions, is provided at another, neighboring location. This device 70' also comprises a memory 44 which, when the device 70' has been activated by means of the activating means 50a2 or starting from a noise recognized and belonging to a class, has stored the audio results for this time period. The recording or the audio fingerprints or the psychoacoustic parameters from the memories 44 of the devices 70 and 70' are analyzed by the data analyzer 72 in a next step, for example relative to the extension. However, it is of advantage here for the data analyzer 72 to be connected with both memories of the further device, wherein it is mentioned here that the data analyzer 72 may be arranged in one of the devices 70 and 70' or externally relative to both of them.

In correspondence with further embodiments, a button, like a button 24a', may be integrated in the device 70 so that the device 70 also performs the functionality of the devices 20, 20' or 20".

The optional element 50a' allows automatic triggering of recording after having recognized a classification. Alternatively, it would also be conceivable here for the automatic recording to be started when no noise has been found in any of the signal classes obtained already.

In other words, the method 303 can describe that the functionality of the method 200, i.e. recognizing and classifying noises, like voice, motor noises, music, kitchen blocks, shots, is basically covered and this functionality has been extended by the analysis, starting from a number of microphones at different locations.

It is also to be pointed out here that an automatic recording of certain classes, like with explosions and shots, for example, hinting to terrorism, would also be possible. Here, it would be useful for all the neighboring nodes 70/70' to be switched directly to recording.

Additionally, automatic (for example, temporally limited) recording would also be possible when certain noise threshold values are exceeded over a period of time. The recording may also be extended to neighboring nodes in order to thus perform precise localization of the signal sources by these longer recordings, when merging several nodes (cause study for disturbing sources, separating noise sources).

Potential fields of applications of the three scenarios mentioned above are as follows:
- tourism, hotels, wellness sector, bicycle paths, hiking paths;
- work protection (office work, machine shops, cabin workplaces);
- urban planning (soundscapes, noise mapping);
- public security (monitoring production facilities).

Combinations of methods 100/100', 200/200' and 300 or the functionality of devices 20/20'/20"/20''', 40 and 70/70' would also be conceivable. Examples of this are combinations of device and method for subjectively evaluating and recording in and for a machine evaluation of an apparatus.

It is to be pointed out here that elements having been discussed in connection with a different aspect may of course be applied to a second aspect as well. Exemplarily, the teaching relating to audio fingerprints or psychoacoustic parameters is applicable to all three aspects, wherein the teaching is discussed in greater detail only in connection with the first aspect.

Although some aspects have been described in the context of a device, it is clear that these aspects also represent a description of the corresponding method, such that a block or element of a device also corresponds to a respective method step or a feature of a method step. Analogously, aspects described in the context of a method step also represent a description of a corresponding block or item or feature of a corresponding device. Some or all of the method steps may be executed by (or using) a hardware apparatus, like a microprocessor, a programmable computer or an electronic circuit, for example. In some embodiments, some or several of the most important method steps may be executed by such an apparatus.

An inventively encoded signal, like an audio signal or a video signal or a transport stream signal, may be stored on a digital storage medium or may be transmitted on a transmission medium, like a wireless transmission medium or a wired transmission medium, like the Internet.

The inventive encoded audio signal may be stored on a digital storage medium, or may be transmitted on a transmission medium, like a wireless transmission medium or a wired transmission medium, like the Internet, for example.

Depending on certain implementation requirements, embodiments of the invention can be implemented in hardware or in software. The implementation can be performed using a digital storage medium, for example a floppy disk, a DVD, Blu-Ray disc, CD, ROM, PROM, EPROM, EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, like a computer, or a programmable logic device, configured to or adapted to perform one of the methods described herein.

A further embodiment comprises a computer having installed thereon the computer program for performing one of the methods described herein.

A further embodiment according to the invention comprises a device or a system configured to transfer a computer program for performing at least one of the methods described herein to a receiver. The transmission can be performed electronically or optically. The receiver may, for example, be a computer, a mobile device, a memory device or the like. The device or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field programmable gate array may cooperate with a microprocessor in order to perform one of the methods described herein. Generally, in some embodiment, the methods are performed by any hardware device. This can be universally applicable hardware, such as a computer processor (CPU), or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such altera-

The invention claimed is:

1. A method for associating noises of at least one signal class of a plurality of signal classes, comprising:
receiving environmental noises;
establishing whether the environmental noises or a set of parameters derived from the environmental noises fulfill/s a predefined rule which describes the signal class of the plurality of signal classes;
logging that the predefined rule has been fulfilled, or recording the environmental noises received for a migrating time window, or deriving a set of parameters from the environmental noises for the migrating time window and storing the set of parameters for the migrating time window, or emitting an activation signal for another device for recognizing a noise,
wherein receiving and establishing are performed again for neighboring positions in order to determine a relation between the environmental noises at a first position and the environmental noises at a second position, wherein the environmental noises at the first position and the environmental noises at the second position resulting from a same noise source, or in order to determine a relation between the set of parameters derived from the environmental noises at the first position and the set of parameters derived from the environmental noises at the second position, wherein the environmental noises at the first position and the environmental noises at the second position resulting from a same noise source;
wherein determining a relation comprises determining a difference in level of the environmental noises at the first and second positions; or
wherein determining a relation comprises determining a temporal offset and/or a run-time offset of the environmental noises at the first and second positions; or
wherein determining a relation comprises determining differences in frequency and/or determining Hall effects in the environmental noises at the first and second positions; or
wherein the method comprising analyzing relative to a distance between the first and second positions, analyzing a movement of a source of the noise and/or analyzing a size of the source of the noise starting from the relation.

2. The method in accordance with claim 1, wherein establishing is performed by comparing the environmental noises to a recording buffered before and the predefined rule defines an at least partial match of the environmental noises and the recording buffered before.

3. The method in accordance with claim 1, wherein establishing is performed by comparing the derived set of parameters to a set of parameters derived before and the predefined rule defines an at least partial match of the derived set of parameters and the set of parameters derived before.

4. The method in accordance with claim 2, wherein the derived set of parameters and the set of parameters derived before comprise an audio fingerprint.

5. The method in accordance with claim 2, wherein the recording buffered before and/or the set of parameters derived before are/is received by an external database.

6. The method in accordance with claim 1, wherein the derived set of parameters comprises psychoacoustic parameters, and wherein establishing is performed by evaluating the psychoacoustic parameters of the environmental noises and the predefined rule comprises threshold values for the psychoacoustic parameters.

7. The method in accordance with claim 6, wherein the psychoacoustic parameters comprise volume, sharpness, tonality, roughness, impulse characteristic and/or intensity of variation.

8. The method in accordance with claim 1, wherein, when logging, information on the frequency of the noise of the signal classes comprise the signal class; or
wherein the information comprise a time indication of when the noise of the signal class was identified and/or an indication of place where the noise of the signal class was identified.

9. The method in accordance with claim 2, wherein the recordings or parameters acquired before are read in from an external database.

10. The method in accordance with claim 1, wherein the predefined rule describes an environmental noise or a set of parameters for a control signal so that the activation signal is emitted when the predefined rule has been fulfilled.

11. A non-transitory digital storage medium having stored thereon a computer program for performing a method for associating noises of at least one signal class of a plurality of signal classes, comprising:
receiving environmental noises;
establishing whether the environmental noises or a set of parameters derived from the environmental noises fulfill/s a predefined rule which describes the signal class of the plurality of signal classes;
logging that the predefined rule has been fulfilled, or recording the environmental noises received for a migrating time window, or deriving a set of parameters from the environmental noises for the migrating time window and storing the set of parameters for the migrating time window, or emitting an activation signal for another device for recognizing a noise,
wherein receiving and establishing are performed again for neighboring positions in order to determine a relation between the environmental noises at a first position and the environmental noises at a second position, wherein the environmental noises at the first position and the environmental noises at the second position resulting from a same noise source, or in order to determine a relation between the set of parameters derived from the environmental noises at the first position and the set of parameters derived from the environmental noises at the second position, wherein the environmental noises at the first position and the environmental noises at the second position resulting from a same noise source,
wherein determining a relation comprises determining a difference in level of the environmental noises at the first and second positions; or
wherein determining a relation comprises determining a temporal offset and/or a run-time offset of the environmental noises at the first and second positions; or
wherein determining a relation comprises determining differences in frequency and/or determining Hall effects in the environmental noises at the first and second positions; or
wherein the method comprising analyzing relative to a distance between the first and second positions, analyzing a movement of a source of the noise and/or analyzing a size of the source of the noise starting from the relation
when said computer program is run by a computer.

12. A device for associating noises of at least one signal class of a plurality of signal classes, comprising:
- a microphone for receiving environmental noises;
- a processor for establishing whether the environmental noises or a set of parameters derived from the environmental noises fulfill/s a predefined rule which describes the signal class of the plurality of signal classes;
- an interface for logging that the predefined rule has been fulfilled, or recording the environmental noises received for a migrating time window, or deriving a set of parameters from the environmental noises for the migrating time window and storing the set of parameters for the migrating time window, or emitting an activation signal for another device for recognizing a noise
- wherein receiving and establishing are performed again for neighboring positions in order to determine a relation between the environmental noises at a first position and the environmental noises at a second position, wherein the environmental noises at the first position and the environmental noises at the second position resulting from a same noise source, or in order to determine a relation between the set of parameters derived from the environmental noises at the first position and the set of parameters derived from the environmental noises at the second position, wherein the environmental noises at the first position and the environmental noises at the second position resulting from a same noise source;
- wherein determining a relation comprises determining a difference in level of the environmental noises at the first and second positions; or
- wherein determining a relation comprises determining a temporal offset and/or a run-time offset of the environmental noises at the first and second positions; or
- wherein determining a relation comprises determining differences in frequency and/or determining Hall effects in the environmental noises at the first and second positions; or
- wherein the method comprising analyzing relative to a distance between the first and second positions, analyzing a movement of a source of the noise and/or analyzing a size of the source of the noise starting from the relation.

13. The device in accordance with claim 12, wherein the device comprises a communication interface by means of which a protocol may be output and/or by means of which the predefined rule may be read in and/or by means of which communication with another device is possible.

14. The device in accordance with claim 13, wherein the device is configured to be networked with another device at a neighboring position in order to determine a relation between the environmental noises of the first position and the environmental noises of the second position or between the set of parameters derived from the environmental noises of the first position and the set of parameters derived from the environmental noises of the second position.

15. A method for analyzing noises of at least one signal class of a plurality of signal classes, comprising:
- receiving environmental noises at a first position;
- establishing whether the environmental noises of the first position or a set of parameters derived from the environmental noises of the first position fulfill/s a predefined rule which describes the signal class of the plurality of signal classes;
- receiving environmental noises at a second position;
- establishing whether the environmental noises of the second position or a set of parameters derived from the environmental noises of the second position fulfill/s a predefined rule which describes the signal class of the plurality of signal classes; and
- determining a relation between the environmental noises of the first position and the environmental noises of the second position, wherein the environmental noises at the first position and the environmental noises at the second position resulting from a same noise source, or between the set of parameters derived from the environmental noises of the first position and the set of parameters derived from the environmental noises of the second position, wherein the environmental noises at the first position and the environmental noises at the second position resulting from a same noise source;
- wherein determining a relation comprises determining a difference in level of the environmental noises at the first and second positions; or
- wherein determining a relation comprises determining a temporal offset and/or a run-time offset of the environmental noises at the first and second positions; or
- wherein determining a relation comprises determining differences in frequency and/or determining Hall effects in the environmental noises at the first and second positions; or
- wherein the method comprising analyzing relative to a distance between the first and second positions, analyzing a movement of a source of the noise and/or analyzing a size of the source of the noise starting from the relation.

16. The method in accordance with claim 15, wherein the received environmental noises at the first and/or second position are recorded for a migrating time window, or wherein the set of parameters is derived from the environmental noises at the first and/or second position for the migrating time window.

17. The method in accordance with claim 15, wherein establishing is performed by comparing the environmental noises to a recording buffered before and the predefined rule defines an at least partial match of the environmental noises and the recording buffered before.

18. The method in accordance with claim 15, wherein establishing is performed by comparing the derived set of parameters to a set of parameters derived before and the predefined rule defines an at least partial match of the derived set of parameters and the set of parameters derived before.

19. The method in accordance with claim 18, wherein the derived set of parameters and the set of parameters derived before comprise an audio fingerprint.

20. The method in accordance with claim 16, wherein the recording buffered before and/or the set of parameters derived before are/is received from an external database.

21. A non-transitory digital storage medium having stored thereon a computer program for performing a method for analyzing noises of at least one signal class of a plurality of signal classes, comprising:
- receiving environmental noises at a first position;
- establishing whether the environmental noises of the first position or a set of parameters derived from the environmental noises of the first position fulfill/s a predefined rule which describes the signal class of the plurality of signal classes;
- receiving environmental noises at a second position;
- establishing whether the environmental noises of the second position or a set of parameters derived from the environmental noises of the second position fulfill/s a predefined rule which describes the signal class of the plurality of signal classes; and determining a relation between the environmental noises of the first position and the environmental noises of the second position, wherein the environmental noises at the first position and the environmental noises at the second position resulting from a same noise source, or between the set of parameters derived from the environmental noises of the first position and the set of parameters derived from the environmental noises of the second position, wherein the environmental noises at the first position and the environmental noises at the second position resulting from a same noise source, wherein determining a relation comprises determining a difference in level of the environmental noises at the first and second positions; or wherein determining a relation comprises determining a temporal offset and/or a run-time offset of the environmental noises at the first and second positions; or wherein determining a relation comprises determining differences in frequency and/or determining Hall effects in the environmental noises at the first and second positions; or wherein the method comprising analyzing relative to a distance between the first and second positions, analyzing a movement of a source of the noise and/or analyzing a size of the source of the noise starting from the relation when said computer program is run by a computer.

22. A system for analyzing noises of at least one signal class of a plurality of signal classes, comprising:

a first unit comprising a first microphone for receiving environmental noises at a first position;

a second unit comprising a second microphone for receiving environmental noises at a second position; and a processor for establishing whether the environmental noises of the first position or a set of parameters derived from the environmental noises of the first position fulfill/s a predefined rule which describes the signal class of the plurality of signal classes, and for establishing whether the environmental noises of the second position or a set of parameters derived from the environmental noises of the second position fulfill/s a predefined rule which describes the signal class of the plurality of signal classes;

wherein the processor is configured to determine a relation between the environmental noises of the first position and the environmental noises of the second position, wherein the environmental noises at the first position and the environmental noises at the second position resulting from a same noise source, or between the set of parameters derived from the environmental noises of the first position and the set of parameters derived from the environmental noises of the second position, wherein the environmental noises at the first position and the environmental noises at the second position resulting from a same noise source;

wherein determining a relation comprises determining a difference in level of the environmental noises at the first and second positions; or wherein determining a relation comprises determining a temporal offset and/or a run-time offset of the environmental noises at the first and second positions; or wherein determining a relation comprises determining differences in frequency and/or determining Hall effects in the environmental noises at the first and second positions; or wherein the method comprising analyzing relative to a distance between the first and second positions, analyzing a movement of a source of the noise and/or analyzing a size of the source of the noise starting from the relation.

23. The system in accordance with claim 22, wherein the first and second units are connected via a communication interface and/or a radio interface.

* * * * *